United States Patent
Mayer et al.

(10) Patent No.: US 9,118,534 B2
(45) Date of Patent: Aug. 25, 2015

(54) TRANSMITTER AND RECEIVER (71) Applicant: Intel Mobile Communications GmbH, Neubiberg (DE)

(72) Inventors: Christian Mayer, Linz (AT); Jan Zaleski, Linz (AT); Thomas Mayer, Linz (AT)

(73) Assignee: Intel Deutschland GmbH, Neubiberg (DE)

( * ) Notice: Subject to any disclaimer, the term of this patent is extended or adjusted under 35 U.S.C. 154(b) by 53 days.

(21) Appl. No.: 13/832,651

(22) Filed: Mar. 15, 2013

(65) Prior Publication Data

US 2014/0269855 A1 Sep. 18, 2014

(51) Int. Cl.
  *H04B 1/38* (2015.01)
  *H04L 5/16* (2006.01)
  *H04L 27/26* (2006.01)

(52) U.S. Cl.
  CPC ........ *H04L 27/2657* (2013.01); *H04L 27/2627* (2013.01)

(58) Field of Classification Search
  CPC ............ H04L 27/2647; H04L 27/2601; H04L 27/2626; H04L 24/2657; H04B 10/50
  USPC .................. 375/219; 455/73, 75–77; 370/252
  See application file for complete search history.

(56) References Cited

U.S. PATENT DOCUMENTS

| | | | |
|---|---|---|---|
| 6,292,462 B1 * | 9/2001 | Cook et al. .................... | 370/210 |
| 8,120,389 B2 * | 2/2012 | Xiu .............................. | 327/105 |
| 8,693,307 B2 * | 4/2014 | Egawa et al. ................. | 370/208 |
| 2007/0110194 A1 | 5/2007 | De Obaldia et al. | |
| 2008/0317188 A1 | 12/2008 | Staszewski et al. | |
| 2009/0046790 A1 * | 2/2009 | Soliman ........................ | 375/260 |
| 2009/0190694 A1 | 7/2009 | Kobayashi | |
| 2010/0091919 A1 * | 4/2010 | Xu et al. ....................... | 375/346 |
| 2010/0128829 A1 * | 5/2010 | Drugge et al. ................ | 375/354 |
| 2010/0260242 A1 | 10/2010 | Abe et al. | |
| 2010/0323643 A1 | 12/2010 | Ridgers | |
| 2011/0064150 A1 | 3/2011 | Uozumi et al. | |
| 2011/0148490 A1 | 6/2011 | Lee et al. | |
| 2012/0176196 A1 * | 7/2012 | Khlat ............................ | 330/127 |
| 2012/0320769 A1 * | 12/2012 | Callender ..................... | 370/252 |

(Continued)

OTHER PUBLICATIONS

3GPP TR 36.912 v.10.0.0 "LTE; Feasibility study for Further Advancements for E-UTRA (LTE-Advanced)" ETSI TR 136 912 V10.0.0 (Mar. 2011).*

(Continued)

*Primary Examiner* — Daniel Washburn
*Assistant Examiner* — Amneet Singh
(74) *Attorney, Agent, or Firm* — Eschweiler & Associates, LLC (57) ABSTRACT

A multicarrier transmitter has a first mode, in which the transmitter is configured to transmit a first component carrier signal modulated onto a first carrier by using a first LO signal, and a second mode, in which the transmitter is configured to transmit the first component carrier signal modulated onto the first carrier and a second component carrier signal modulated onto a second carrier by using a second LO signal. The multicarrier transmitter is coupled to a controllable oscillator and configured to adapt a frequency of an LO signal output by the controllable oscillator dependent on the multicarrier transmitter being activated in the first or second mode to output the first LO signal or the second LO signal. For example, the multicarrier transmitter may be configured to switch between the first mode and the second mode while transmitting the component carrier signals.

13 Claims, 4 Drawing Sheets

(56) References Cited

U.S. PATENT DOCUMENTS

2013/0058300 A1* 3/2013 Perets et al. .................. 370/329
2013/0099829 A1* 4/2013 Vilander et al. .............. 327/106
2013/0136211 A1* 5/2013 Jussila et al. .................. 375/340
2013/0279633 A1* 10/2013 Morris et al. ................. 375/324

OTHER PUBLICATIONS

Yonis et al., "Effective Carrier Aggregation on the LTE-Advanced Systems" International Journal of Advance Science and Technology, vol. 41, Apr. 2012.*
Zemeda, M., "LTE-Advanced Design and Test Challenges—Carrier Aggregation," Agilent Technology, slides 2-35, 2012.*
U.S. Appl. No. 13/799,853, filed Mar. 13, 2013.
Pavlovic, N. et al.: "A 5.3GHz Digital-to-Time-Converter-Based Fractional-N All-Digital PLL" in: IEEE Solid-State Circuits Conference Digest of Technical Papers (ISSCC), Feb. 2011, pp. 54-56.
Chen, P. et al.: "FPGA Vernier Digital-to-Time Converter With 1.58 ps Resolution and 59.3 Minutes Operation Range" in: IEEE Transactions on Circuits and Systems I, vol. 57, Issue 6, Jun. 2010, pp. 1134-1142.
Choi, Y.-C. et al.: "A Fully Digital Polar Transmitter Using a Digital-to-Time Converter for High Data Rate System" in: IEEE Radio-Frequency Integration Technology RFIT 2009, Jan. 2009, pp. 56-59.
Roberts, G. W. et al.: "A Brief Introduction to Time-to-Digital and Digital-to-Time Converters" in: IEEE Transactions on Circuits and Systems II, vol. 57, No. 3, Mar. 2010, pp. 153-157.
Office Action Dated Jul. 23, 2014 U.S. Appl. No. 13/799,853.
Final Office Action Dated Dec. 8, 2014 U.S. Appl. No. 13/799,853.
Non Final Office Action Dated Oct. 6, 2014 U.S. Appl. No. 13/799,853.
Notice of Allowance Dated Feb. 17, 2015 U.S. Appl. No. 13/799,853.

* cited by examiner

TRANSMITTER AND RECEIVER

FIELD

Embodiments of the present disclosure refer to a transmitter, a receiver, and a mobile communication device comprising a transmitter and/or the receiver. Further embodiments refer to a method for transmitting an outbound RF signal and for receiving an inbound RF signal.

BACKGROUND

Recent communication devices, e.g. a mobile phone or a smart phone, are designed to provide high data throughput for inbound and outbound RF signals.

A method called carrier aggregation is used for increasing the data throughput by increasing the bandwidth of the inbound signals (downlink) and of the outbound signals (uplink). Carrier aggregation, which is part of the 3GPP UMTS standard and the LTE standard enables utilization of more than one carrier (or cell in UMTS terminology) for transmission and reception. Each aggregated carrier is referred to as a component carrier (CC). The component carrier may have a bandwidth of 1.4, 3, 5, 10, 15 or 20 MHz and a maximum of five component carriers can be aggregated, hence the maximum aggregated bandwidth is 100 MHz.

The distinction may be made between intra-band contiguous aggregation, intra-band non-contiguous aggregation and inter-band aggregation (aggregating of spectra being in different bands). Below, the handling of multiple (aggregated) carriers within a transmitter (e.g. a transmitter of a mobile communication device) will be discussed, wherein the aggregation in case of a receiver is based on the same principle and may have comparable characteristics.

In a transmitter having a plurality of transmit chains, for example two, a separate transmit chain is used for each carrier of the aggregated carriers. Here, each transmit chain just needs to support the transmission bandwidth of the one (component) carrier. However, the use of separate transmit chains causes additional chip space requirements. Furthermore, more than one, e.g. two, LO signals are needed to transfer the baseband signals to the RF domain. These LO signals may be very close in frequency, especially in an intra-band contiguous case, and therefore the unit generating these LO signals, e.g. a PLL (phase locked loop), is very sensitive with respect to cross-talk. Therefore, there is a need for an improved approach.

SUMMARY

A multicarrier transmitter has a first mode, in which the transmitter is configured to transmit a first component carrier signal modulated onto a first carrier by using a first LO signal, and a second mode, in which the transmitter is configured to transmit the first component carrier signal modulated onto the first carrier and a second component carrier signal modulated onto a second carrier by using a second LO signal. The multicarrier transmitter is coupled to a controllable oscillator and configured to adapt a frequency of an LO signal output by the controllable oscillator dependent on the multicarrier transmitter being activated in the first or second mode to output the first or the second LO signal.

A multicarrier receiver has a first mode, in which the receiver is configured to receive a first component carrier signal modulated onto a first carrier by using a first LO signal, and a second mode, in which the receiver is configured to receive the first component carrier signal modulated onto the first carrier and a second component carrier signal modulated onto a second carrier by using a second LO signal. The multicarrier receiver is coupled to a controllable oscillator and configured to adapt a frequency of an LO signal output by the controllable oscillator dependent on the multicarrier receiver being activated in the first or second mode to output the first or the second LO signal.

A mobile communication device comprises an above described multicarrier transmitter and/or an above described multicarrier receiver.

A method for transmitting an output RF signal comprises transmitting a first component carrier signal modulated onto the first carrier in a first mode, using a first LO signal output by a controllable oscillator, and transmitting the first component carrier signal modulated onto the first carrier and a second component carrier signal modulated onto a second carrier in a second mode, using a second LO signal. The method further comprises adapting the frequency of the LO signal dependent on an activation of the first or second mode to output the first or the second LO signal.

A method for receiving an inbound RF signal comprises receiving a first component carrier signal modulated onto a first carrier in a first mode, using a first LO signal output by a controllable oscillator, and receiving the first component carrier signal modulated onto the second carrier and a second component carrier signal modulated onto a second carrier in a second mode, using a second LO signal. The method further comprises adapting a frequency of the LO signal dependent an activation of the first or second mode to output the first or the second LO signal.

BRIEF DESCRIPTION OF THE DRAWINGS

Below, embodiments of the present disclosure will be discussed referring to the enclosed figures, wherein.

DETAILED DESCRIPTION

Different implementations of the teachings disclosed herein will subsequently be discussed referring to FIGS. 1 to 4 below. Identical reference numerals are provided to objects having identical or similar functions so that objects referred to by identical reference numerals within different implementations are interchangeable and the description thereof is mutually applicable.

Figure 1:
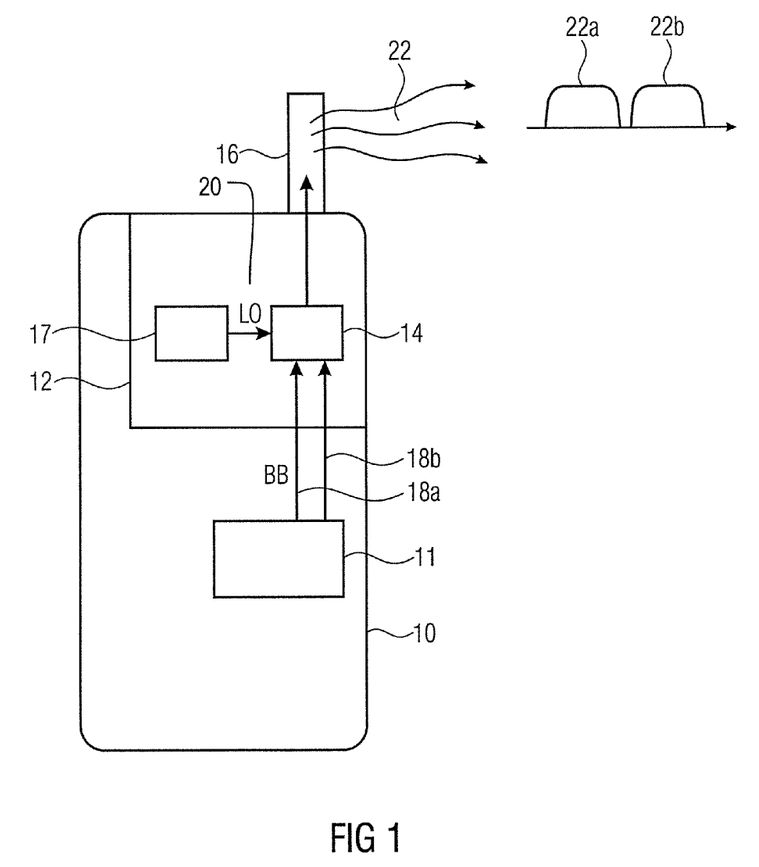
FIG. 1 shows an example application of a transmitter having a first mode for transmitting one baseband signal and a second mode for transmitting a plurality of baseband signals.

FIG. 1 shows a mobile communication device 10, e.g. a mobile phone or smart phone, comprising a baseband processor 11 and a transmitter unit 12. The transmitter unit 12 comprises an oscillator 17 and just one transmitter 14 (transmission chain) and is coupled to an antenna 16.

The transmitter 14 is configured to combine the one or more baseband signals 18a and/or 18b provided by the baseband processor 11 with LO signals 20 provided by the oscillator 17 in order to output an outbound RF signal 22 via the antenna 16, wherein the outbound RF signal 22 comprises the component carrier signal 22a and/or 22b.

Starting from the simple case that just the one baseband signal 18a (also referred to as modulation signal) should be transmitted via the component carrier signal 22a, the baseband signal 18a is modulated onto a first carrier. This modulation may be performed by a mixer (not shown) of the transmitter (chain) 14 which is configured to perform an up-converting of the baseband signal 18a and the LO signal 20 such that a first component carrier signal 22a is output. The first component carrier signal 22a carrying the baseband signal 18a has the first carrier frequency, e.g. 2.1 GHz (or in a range between 700 MHz and 5.5 GHz), being a derivate of or equal to the frequency of the LO signal 20, and, for example, and a bandwidth of 10 MHz (or in a range between 1 MHz and 50 MHz) determined by the baseband signal 18a. The bandwidth limits the data throughput and, vice versa, is limited by respective carriers lying adjacent to the respective carrier 22a.

In case of using a transmitter 14 providing enough bandwidth for multiple component carriers lying next to each other a plurality of baseband signals 18a and 18b may be transmitted via the one transmitter 14 to the transmitter unit 12. For the sake of simplification, the below discussion is made based on the assumption that contiguous aggregation is used. Here, the one or more baseband signals 18a and 18b, e.g. one baseband signal for each component carrier 22a and 22b, are typically shifted first in frequency and then added. Note, that the signal processing of the baseband signals 18a and 18b may be performed by the RF Chip 12 or by the baseband processor 11. Thus, the baseband processor 11 may be configured to output two parallel baseband signals 18a and 18b to the transmitter 14 or may be configured to combine the two baseband signals 18a and 18b to a combined baseband signal 18 which is output to the transmitter 14. After this the combined signal 18a and 18b is up-converted to the RF domain by using the one LO signal 20, a frequency of which is typically changed when compared to the LO signal 20 used for transmitting just the one component carrier signal 22a. I.e. that the two baseband signals 18a and 18b are combined with the one LO signal 20 so that an RF signal 22 comprising the first component carrier signal 22a and the second component carrier signal 22b is output via the one transmit chain 14 and the antenna 16. This discussed approach enables to circumvent the cross-talk problems. However, the increased bandwidth must be available as soon as the transmitter is configured to support the contiguous carrier aggregation, independent of whether both carriers are used or not.

Figure 2A:
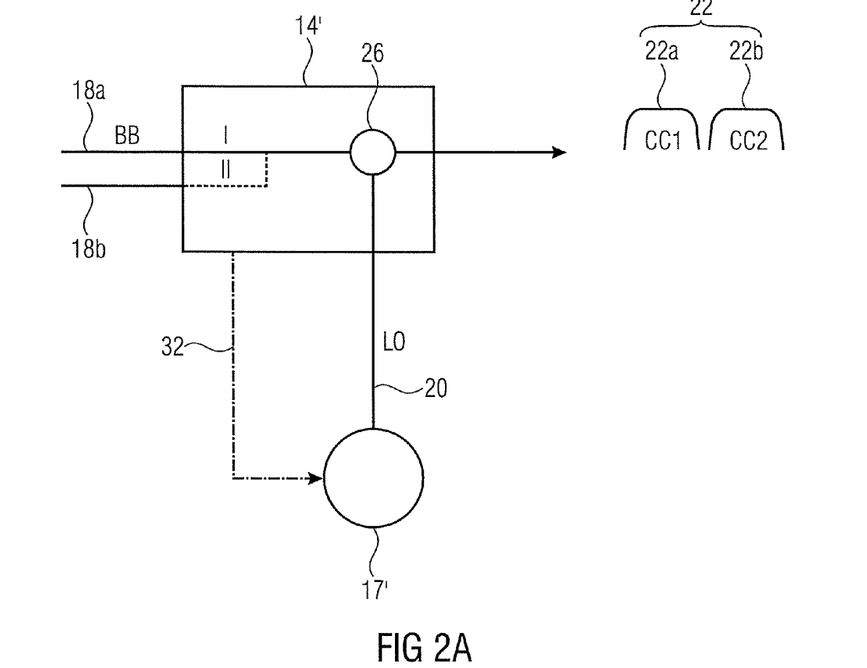
FIG. 2a shows an example block diagram of a transmitter configured to operate in the first mode and in a second mode and to control an oscillator dependent on the activated mode.
Figure 2B:
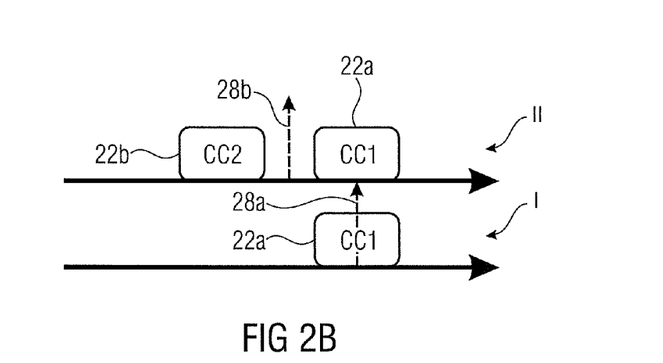
FIG. 2b shows a first example diagram for illustrating the first mode and a second example diagram for illustrating the second mode.

Current 3GPP specifications allow a transient period for turning the transmitter off and on for uplink second carrier configurations. A transient for second carrier activation might also get specified in the near future. However, no exception can be applied for actually turning on/off the second carrier, i.e. allocating resources on that carrier. This means that the transmitter is allowed to be switched on and off for configuration or activation of the second carrier, but not in the transmission phase, so the configuration of the frequency of the LO signal and of the controllable oscillator 17, respectively, and of the bandwidth is done before transmission. For example, it is unable to turn off the second carrier for slots or subframes where it is not needed. Therefore, there is the need for an improved approach which will be shown with respect to FIG. 2.

FIG. 2a shows a multicarrier transmitter 14'. The multicarrier transmitter 14' comprises a combination element 26, for example a mixer. The combination element 26 is connected to the baseband processor (not shown) for receiving the baseband signals 18a and/or 18b. Furthermore, the combination element 26 is coupled to the controllable oscillator 17' for receiving the LO signal 20 and to an RF output for outputting the RF signal 22.

As illustrated by the roman numerals, the transmitter 14' may have two modes. When activating the first mode, marked by a I, the transmitter 14' is configured to combine the first baseband signal 18a with the LO signal 20 in order to transmit the first component carrier signal 22a. This first mode is also illustrated by FIG. 2b.

FIG. 2b shows two diagrams, wherein the diagram marked by the I illustrates the first mode (for transmitting the first carrier component signal 22a). As illustrated, the carrier component signal 22a is modulated onto a carrier 28a. The carrier 28a is based on the LO signal 20, so the carrier 28a may be equal to (or at least dependent on) the frequency of the LO signal 20. Consequently, the controllable oscillator 17' may be controlled such that its oscillation frequency is selected in accordance with the wanted carrier 28a. As explained above, this frequency setting for the controllable oscillator 17' is typically done before transmitting the component carrier signals 22a.

When activating the second mode (cf. II) the transmitter 14' is configured to transmit more than one component carrier signal, namely the component carrier signal 22a and an additional component carrier signal 22b. The second component carrier signal 22b may preferably be adjacent to the first component carrier signal 22a in one embodiment.

This is illustrated by the diagram marked with a II of FIG. 2b. As illustrated, the second carrier 28b for the second mode is shifted when compared to the first carrier 28a of the first mode. The background thereof is that an optimum transmission of the component carrier signals 22a and 22b may be achieved when the used carrier 28b is centered within the total bandwidth of the two component carrier signals 22a and 22b, so the exact position is dependent on the channel bandwidth of both carriers 22a and 22b. Here, the carrier 28b lies between the two component carrier signals 22a and 22b (within the spacing), which is typical when the bandwidths of the two component carrier signals 22a and 22b are equal. The frequency adjustment of mode I and II may be summed up that the frequency of the oscillator 17' is adjusted such that the frequency of the LO signal is centered (+/−20%) within the total bandwidth of all component carrier signals (22a and 22b) to be transmitted. It should be noted that the frequency adjustment is not limited to this case, so the LO signal may be shifted a few MHz away from the center in some cases, like to put it in between of non-equal bandwidth carriers or to move away LO harmonics or other spurious emissions from protected frequency ranges.

This adjustment of the carrier, namely from the carrier 28a to the carrier 28b, is performed by the transmitter 14' which is configured to control the controllable oscillator 17', e.g. by using a frequency offset signal 32 (cf. arrow with broken lines). This means that the transmitter 14' is configured to dynamically switch the LO position at those times where the second component carrier 22b is actually used or has stopped being used. In general, the transmitter 14' is configured to perform an adjustment of the frequency of the LO signal 20 in accordance with an activation of the first mode or of the second mode. To sum up, the transmitter 14' enables operation with just the bandwidth that is needed for the current carrier usage. This potentially saves power as for lower bandwidth transmission chains lower clock rates and thus lower power consumption can be expected. Additionally, spectral emissions can be reduced for the transmitter 14' because narrower filtering can be applied.

Below, two different concepts for adjusting the frequency of the LO signal 20 are discussed.

Figure 3A:
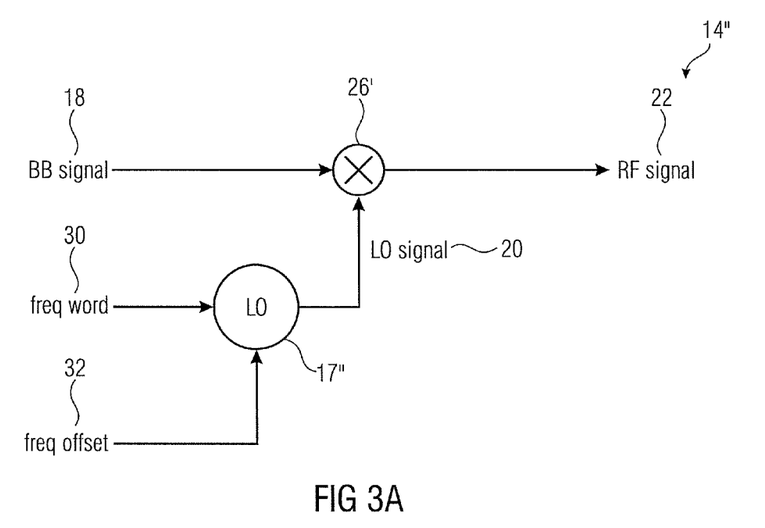
FIGS. 3a and 3b show example block diagrams of implementations of transmitters having two (transmission) modes.

FIG. 3*a* shows a further multicarrier transmitter 14" comprising a combination element 26', here formed by a mixer 26'. The mixer 26' is coupled to the baseband processor (not shown, cf. baseband signal 18) and to a local oscillator 17" (e.g. voltage controlled oscillator) as well as to the RF output (not shown, cf. RF signal 22).

Although it is not directly shown, it is understood that the baseband signal 18 may comprise a first baseband signal and a second baseband signal, wherein the mixer 26' is configured to output one or more component carrier signals 22 dependent on the number of baseband signals 18, i.e. that the shown transmitter 14" is configured to operate in the first and the in the second mode.

The frequency of the LO signal 20 output by the local oscillator 17" is set dependent on the activated operation mode using two steps. In a first step, the frequency of the LO signal 20 is specified via a frequency word 30, which may be output by the baseband processor (not shown). As mentioned above, the frequency of the local oscillator 17" may be selected before the transmission. I.e. that the frequency word 30 is typically not changed during the transmission phase. In a second step during transmission, the adaption of the frequency of the local oscillator 70" is performed by using a frequency offset signal 32, e.g. a control voltage in case of a voltage controlled oscillator, output by the transmitter 14". Therefore, the local oscillator 17" comprises two control inputs, one for the frequency word 30 and one for the frequency offset signal 32. From another point of view, this means that the frequency of the local oscillator signal is defined by using the frequency word 30 and may be shifted or slightly adjusted via the frequency offset 32.

In order to switch between the first and the second mode during the transmission, it is beneficial in one embodiment to use an oscillator having fast frequency switching, e.g. by using a PLL (phase locked loop) with two point modulation to apply a frequency step.

Figure 3B:
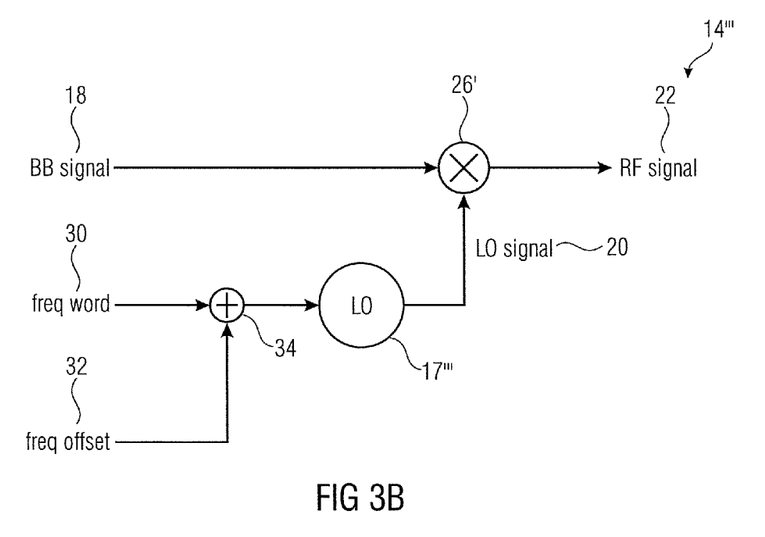

FIG. 3*b* shows a further implementation of a transmitter 14''' comprising the mixer 26' and a local oscillator 17'''. As explained in the context of the implementation shown in FIG. 3*a*, the mixer 26' is arranged between the baseband processor (cf. baseband signal 18) and the RF output (cf. RF signal 22). In contrast, the local oscillator 17''' comprises just one control input at which a combination element 34 is arranged The combination element 34, which may be a summation element, is configured to add the frequency word 30 and the frequency offset signal 32 and output a combined control signal to the oscillator 17''' in order to control the frequency of the LO signal 20. For example, the combination element 34 may be configured to add two control voltages (cf. frequency word 30 and the frequency offset 32) or combine two digital control signals 30 and 32.

Figure 4:
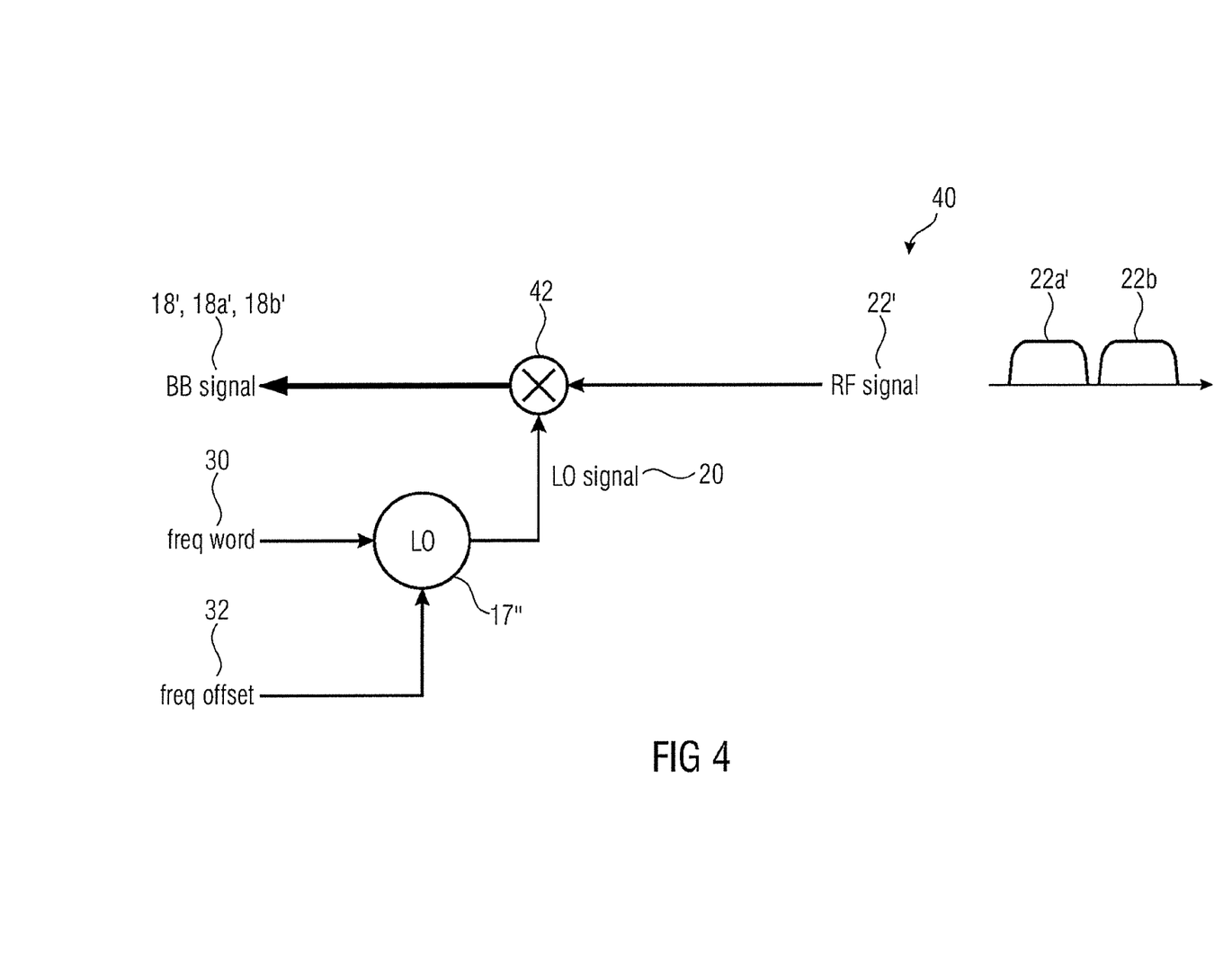
FIG. 4 shows an example block diagram of an implementation of a receiver having two (receiving) modes.

The principle of adjusting the frequency of the LO signal 20 which has been discussed in the context of a transmitter may also be applied to a receiver. FIG. 4 shows an implementation of a receiver 40 comprising a combination element 42, e.g. a mixer, arranged between an RF input (cf. inbound RF signal 22') and a baseband processor (cf. baseband signal 18'). The mixing element 42 is coupled to the oscillator 17" providing the LO signal 20.

Here, the receiver 40 may be configured to receive the inbound RF signal 22' comprising one component carrier signal 22*a'* or more than one component carrier signal, for example the component carrier signals 22*a'* and 22*b'* (cf. FIG. 2*b*). The mixing element 42 performs a downmixing by using the LO signal 20 in order to output the one baseband signal 18*a'* or the two baseband signals 18*a'* and 18*b'* dependent on the activated mode. The receiver 14' is configured to adapt the frequency of the LO signal 20 during operation (data receipt) via the frequency offset signal 32 (control signal) dependent on the activated first or second mode, as explained in the context of FIG. 3*a*. Thus, the requirements regarding the carrier used in the first mode and in the second mode are equal to the requirements discussed in the context of the transmitter, wherein the allocation of the carrier 22*a* and/or 22*b* may be known in advance. To summarize, the transmitter 40 is configured to perform a dynamic LO frequency shifting depending on whether a second carrier 22*b* is allocated or not. This enables the dynamic reconfiguration of the signal chain to an optimum (lowest) bandwidth.

In the shown implementation, the local oscillator 17" comprises two inputs, one for defining the frequency of the LO signal 20 and one for adjusting the frequency in accordance with the activated mode (cf. FIG. 3*a*), wherein it is clear that the frequency adjustment may, alternatively, be done by using an oscillator 17''' coupled to a combination element 34 as discussed in context of FIG. 3*b*. In general, it should be noted that the aspects explained in the context of the transmitter 14', 14" and/or 14''' may also be applied to the receiver 40.

As illustrated by FIG. 1, an implementation of the present disclosure refers to a mobile communication device comprising one of the transmitters 14', 14" or 14'''. A further implementation of the present disclosure refers to a mobile communication device comprising the receiver 40. A further implementation refers to a mobile communication device comprising a transceiver having a transmitter 14', 14" or 14''' and a receiver 40.

Referring to FIG. 2*a* it should be noted that the transmitter 14' may also be configured to transmit more than the shown component carrier signals 22*a* and 22*b*, for example five component carrier signals.

Referring to FIG. 2*b* it should be noted that it is clear for a person skilled in the art that the switching between the two modes (cf. I and II) may be performed in both ways. I.e. the further carrier 22*b* may be activated for transmitting additional subframes or deactivated when the bandwidths is not required any more.

Referring to FIG. 2*b* it should be noted that the transmitter 14', 14" or 14''' may be configured to operate in a third mode (substantially equal to the first) in which just the second component carrier signal 22*b* is transmitted. The component carrier signal 22*b* is based on the second baseband signal 18*b* modulated by using a third LO signal which is, in one embodiment, centered within the second component carrier signal 22*b* (cf. 28*a*).

Referring to FIGS. 3*a*, 3*b* and 4, it should be noted that the local oscillator 17" or the local oscillator 17''' may be formed by a phase locked loop comprising a frequency divider via which the frequency may be adjusted.

Although the above described transmitter 14', 14" or 14''' and/or receiver 40 has been discussed in context of intra-band contiguous aggregation, it should be noted that the transmitter 14', 14" or 14''' and/or receiver 40 may also be used for non-contiguous aggregation (non-adjacent carriers).

Although some aspects have been described in the context of an apparatus, it is clear that these aspects also represent a description of the corresponding method for transmitting an outbound RF signal and/or for receiving an inbound RF signal, where a block or a device corresponds to a method step or a feature of a method step. Analogously, aspects described in the context of a method step also represent a description of a corresponding block or item or feature of a corresponding apparatus. Some or all of the method acts may be executed by (or using) a hardware apparatus, like for example a microprocessor, a programmable computer or an electronic circuit. In some implementations, some one or more of the most important method acts may be executed by such an apparatus.

The above described implementations are merely illustrative of the principles of the present disclosure. It is understood that modifications and variations of the arrangements and the details described herein will be apparent to others skilled in the art. It is the interest, therefore, to be limited only by the scope of the appended patent claims and not by the specific details presented by way of description and explanation of the embodiments herein.

The invention claimed is:

1. A multicarrier transmitter having a first mode, in which the transmitter is configured to transmit a first component carrier signal modulated onto a first carrier by using a first local oscillator (LO) signal, and a second mode, in which the transmitter is configured to transmit the first component carrier signal modulated onto the first carrier and a second component carrier signal modulated onto a second, different carrier by using a second LO signal,
   wherein the multicarrier transmitter is coupled to a controllable oscillator and configured to adapt a frequency of an LO signal output by the controllable oscillator dependent on the multicarrier transmitter being activated in the first mode or the second mode;
   wherein in the first mode, the first LO signal is output from the controllable oscillator; and
   wherein in the second mode, both the first LO signal and the second LO signal are output from the controllable oscillator at different times;
   wherein the frequency of the LO signal is controlled via a control signal for the controllable oscillator;
   wherein the multicarrier transmitter comprises means for adapting the control signal in order to adapt the frequency of the LO signal;
   wherein the multicarrier transmitter comprises the controllable oscillator and a combination element arranged at the control input of the controllable oscillator; and
   wherein the combination element is configured to add a control signal for the controllable oscillator and an offset signal output by the multicarrier transmitter for adapting the frequency of the LO signal.

2. The multicarrier transmitter according to claim 1, wherein the frequency of the LO signal is adapted such that the LO frequency is centered within a total bandwidth comprising the first component carrier signal in the first mode, or centered within a total bandwidth comprising the first and second component carrier signal in the second mode.

3. The multicarrier transmitter according to claim 1, wherein the controllable oscillator is configured to perform a fast frequency shifting.

4. The multicarrier transmitter according to claim 1, wherein the multicarrier transmitter is configured to switch between the first mode and the second mode while transmitting the first component carrier signal and/or the second component carrier signal.

5. The multicarrier transmitter according to claim 1, wherein the multicarrier transmitter has a third mode, in which the transmitter is configured to transmit the second component carrier signal modulated onto the second carrier by using a third LO signal.

6. The multicarrier transmitter according to claim 1, wherein the first LO signal but not the second LO signal is output from the controllable oscillator in the first mode.

7. A multicarrier transmitter having a first mode, in which the transmitter is configured to transmit a first component carrier signal modulated onto a first carrier by using a first local oscillator (LO) signal, and a second mode, in which the transmitter is configured to transmit the first component carrier signal modulated onto the first carrier and a second component carrier signal modulated onto a second, different carrier by using a second LO signal,
   wherein the multicarrier transmitter is coupled to a controllable oscillator and configured to adapt a frequency of an LO signal output by the controllable oscillator dependent on the multicarrier transmitter being activated in the first mode or the second mode;
   wherein in the first mode, the first LO signal is output from the controllable oscillator;
   wherein in the second mode, both the first LO signal and the second LO signal are output from the controllable oscillator at different times; and
   wherein the frequency of the LO signal is adapted such that the frequency is within a tolerance range of a few megahertz (MHz) of +/−10% around the center of the total bandwidth comprising the first component carrier signal in the first mode, or within a tolerance range of a few megahertz (MHz) of +/−10% around the center of the total bandwidth comprising the first and second component carrier signal in the second mode.

8. The multicarrier transmitter according to claim 7, wherein the total bandwidth of the first mode depends on the bandwidth of the first component carrier signal and the first carrier and wherein the total bandwidth of the second mode depends on the bandwidth of the first component carrier signal, the bandwidth of the second component carrier signal, the second carrier and a spacing between the first component carrier signal and the second component carrier signal.

9. The multicarrier transmitter according to claim 7, wherein a frequency of the LO signal is adapted in the second mode such that the frequency of the LO signal lies between the first component carrier signal and the second component carrier signal and/or between the first carrier and the second carrier.

10. A multicarrier receiver having a first mode, in which the receiver is configured to receive a first component carrier signal modulated onto a first carrier by using a first local oscillator (LO) signal, and a second mode, in which the receiver is configured to receive the first component carrier signal modulated onto the first carrier and a second component carrier signal modulated onto a second, different carrier by using a second LO signal,
   wherein the multicarrier receiver is coupled to a controllable oscillator and configured to adapt a frequency of an LO signal output by the controllable oscillator dependent on the multicarrier receiver being activated in the first mode or the second mode;
   wherein in the first mode, the first LO signal is output from the controllable oscillator; and
   wherein in the second mode, both the first LO signal and the second LO signal are output from the controllable oscillator at different times
   wherein the frequency of the LO signal is controlled via a control signal for the controllable oscillator;
   wherein the multicarrier receiver comprises means for adapting the control signal in order to adapt the frequency of the LO signal;
   wherein the multicarrier receiver comprises the controllable oscillator and a combination element arranged at the control input of the controllable oscillator; and
   wherein the combination element is configured to add a control signal for the controllable oscillator and an offset signal output by the multicarrier receiver for adapting the frequency of the LO signal.

11. The multicarrier receiver according to claim 10, wherein the multicarrier receiver further comprises a mixer configured to perform a downmixing of an inbound RF signal by using the LO signal in order to output a first baseband signal in the first mode, or output the first baseband signal and a second baseband signal in the second mode.

12. The multicarrier receiver according to claim 10, wherein the multicarrier receiver is configured to perform a switching between the first mode and the second mode while receiving the inbound RF signal.

13. The multicarrier receiver according to claim 10, wherein the first LO signal but not the second LO signal is output from the controllable oscillator in the first mode.

* * * * *